(12) United States Patent
Hardaway et al.

(10) Patent No.: US 9,767,704 B2
(45) Date of Patent: Sep. 19, 2017

(54) METHOD AND DEVICE FOR TRAINING A USER TO SIGHT READ MUSIC

(71) Applicant: THE JOHNS HOPKINS UNIVERSITY, Baltimore, MD (US)

(72) Inventors: Richard Travis Hardaway, Baltimore, MD (US); Ken Lund Johansen, Baltimore, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 0 days.

(21) Appl. No.: 14/434,160

(22) PCT Filed: Oct. 8, 2013

(86) PCT No.: PCT/US2013/063823
§ 371 (c)(1),
(2) Date: Apr. 8, 2015

(87) PCT Pub. No.: WO2014/058845
PCT Pub. Date: Apr. 17, 2014

(65) Prior Publication Data
US 2015/0262500 A1 Sep. 17, 2015

Related U.S. Application Data

(60) Provisional application No. 61/710,942, filed on Oct. 8, 2012.

(51) Int. Cl.
*G09B 15/00* (2006.01)
*G09B 15/02* (2006.01)
(Continued)

(52) U.S. Cl.
CPC ............. *G09B 15/00* (2013.01); *G09B 5/02* (2013.01); *G10H 7/00* (2013.01)

(58) Field of Classification Search
CPC ............ G09B 15/00; G09B 5/02; G10H 7/00
(Continued)

(56) References Cited

U.S. PATENT DOCUMENTS 2,600,968 A * 6/1952 Church ................. G09B 15/00
84/470 R
5,400,687 A * 3/1995 Ishii ..................... G09B 15/002
84/477 R
(Continued)

FOREIGN PATENT DOCUMENTS

JP 2005-249844 A 9/2005
JP 4016594 B2 12/2007
(Continued)

*Primary Examiner* — David Warren
*Assistant Examiner* — Christina Schreiber
(74) *Attorney, Agent, or Firm* — Johns Hopkins Technology Ventures

(57) ABSTRACT

An embodiment in accordance with the present invention provides a method and system for training a student to sight-read music. The method includes displaying a measure of music having at least a first and second phrase of notes. As the student moves through the music, the phrases of notes are removed from the measure of music, in such a way to encourage the student to read ahead of the point at which she is playing. In some exercises, a focal point can be provided in order to train the student to engage the fovea for acquiring pitch information from the measure of music and the parafovea for acquiring rhythm information from the measure of music. The method can be executed on a dedicated computing device such as a tablet or in the form of an application or program for use on a number of different computing devices.

18 Claims, 5 Drawing Sheets

(51) Int. Cl.
*G10H 7/00* (2006.01)
*G09B 5/02* (2006.01)

(58) Field of Classification Search
USPC .......................................... 84/483.2, 477 R
See application file for complete search history.

(56) References Cited

U.S. PATENT DOCUMENTS

| | | | | |
|---|---|---|---|---|
| 6,066,791 A * | 5/2000 | Renard | ............... | G09B 15/002 84/470 R |
| 6,417,435 B2 * | 7/2002 | Chantzis | ............... | G09B 15/04 84/477 R |
| 7,629,527 B2 * | 12/2009 | Hiner | ............... | G09B 15/02 84/470 R |
| 8,431,809 B1 * | 4/2013 | Chan | ............... | G09B 15/02 84/470 R |
| 8,440,898 B2 * | 5/2013 | Kendler | ............... | G10G 1/00 84/477 R |
| 8,907,195 B1 * | 12/2014 | Erol | ............... | G09B 5/06 84/609 |
| 2001/0029830 A1 * | 10/2001 | Rosen | ............... | G09B 15/04 84/478 |
| 2004/0055441 A1 * | 3/2004 | Katsuta | ............... | G09B 15/00 84/470 R |
| 2005/0081701 A1 * | 4/2005 | Shao | ............... | G10G 1/00 84/612 |
| 2007/0221044 A1 * | 9/2007 | Orr | ............... | G10H 1/0025 84/609 |
| 2008/0156171 A1 * | 7/2008 | Guldi | ............... | G09B 15/002 84/466 |
| 2009/0266222 A1 * | 10/2009 | Epstein | ............... | G09B 15/026 84/483.2 |
| 2011/0277615 A1 * | 11/2011 | Kendler | ............... | G10G 1/00 84/483.2 |
| 2013/0077447 A1 * | 3/2013 | Hiratsuka | ............... | G10H 1/0066 367/199 |

FOREIGN PATENT DOCUMENTS

| | | |
|---|---|---|
| KR | 10-0856928 B1 | 9/2008 |
| WO | 2007-129025 A2 | 11/2007 |
| WO | WO 2007129025 A2 * | 11/2007 ............... G09B 5/02 |

* cited by examiner

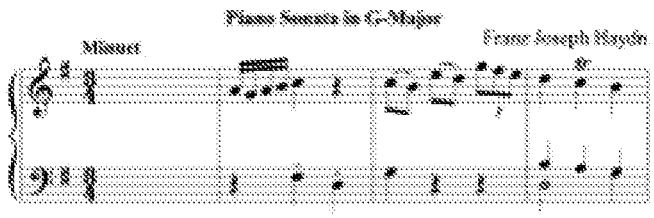
FIG. 1A
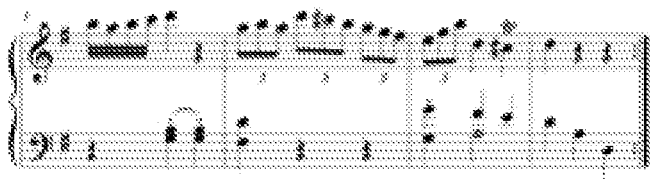
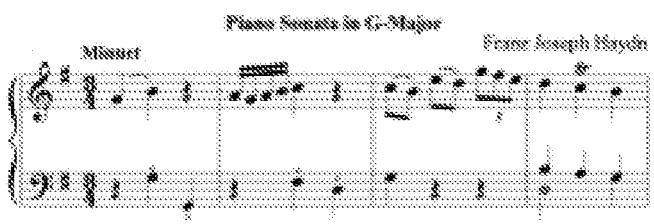
FIG. 1B
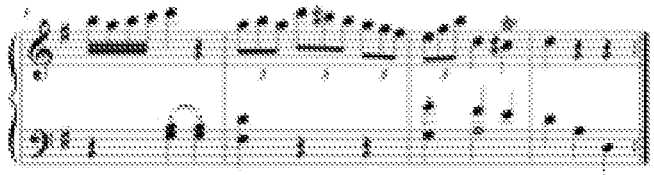
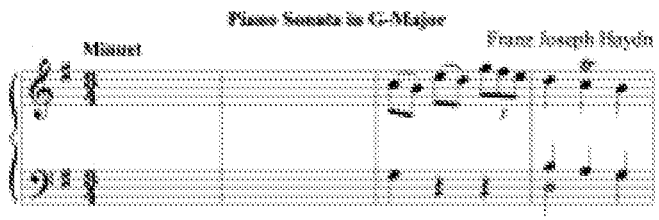
FIG. 1C
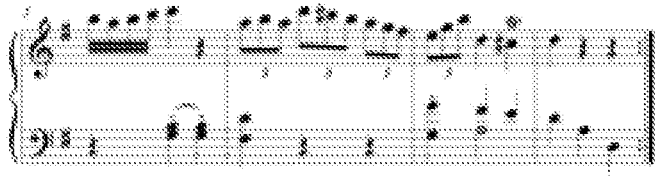

METHOD AND DEVICE FOR TRAINING A USER TO SIGHT READ MUSIC

CROSS-REFERENCE TO RELATED APPLICATIONS

This application is a 35 U.S.C. §371 U.S. national entry of International Application PCT/US2013/063823, having an international filing date of Oct. 8, 2013, which claims the benefit of U.S. Provisional Application No. 61/710,942, filed Oct. 8, 2012, the content of each of the aforementioned applications is herein incorporated by reference in their entirety.

FIELD OF THE INVENTION

The present invention relates generally to music education. More particularly, the present invention relates to a device and method for training a user to sight read musical notes.

BACKGROUND OF THE INVENTION

Characteristically, one of the most difficult tasks for a music student is learning to sight-read music and to read ahead of where she is playing. Reading ahead is required in order to give the mind and hands of the music student enough time to prepare the appropriate kinesthetic response. Such training is difficult, in part, because of preexisting reading habits and the number of things to concentrate on while sight reading.

It would therefore be advantageous to provide a training method and device to assist a music student in the task of learning to sight-read music while playing an instrument.

SUMMARY OF THE INVENTION

The foregoing needs are met, to a great extent, by the present invention, wherein in one aspect a method for training a user to sight read music includes displaying at least a first measure and a second measure of music wherein the first measure is disposed in a first position ahead of the second measure disposed in a second position. The method includes removing the first measure from the display. Additionally, the method includes timing the removal of the first measure of music to a predetermined tempo.

In accordance with another aspect of the present invention, the method further includes setting the timing to an audio click-track. A count-off can be provided before the beginning of an exercise. The user can choose the predetermined tempo or the predetermined tempo can be programmed based on a level of skill of the user. A visual point of focus for the user can also be provided in an exercise, wherein the visual point of focus is configured to train the user to engage a fovea to acquire pitch information in the measure of music and a parafovea to acquire rhythm information from the measure of music. The method can include an initial set of musical works for training. New sets of musical works for training can also be made available on a periodic basis. The method can also be fixed onto a computer readable medium.

In accordance with another aspect of the present invention, a system for training a user to sight read music includes a display screen, a user interface, and a non-transitory computer readable medium. The non-transitory computer readable medium is programmed to display at least a first measure and a second measure of music wherein the first measure is disposed in a first position ahead of the second measure disposed in a second position. The non-transitory computer readable medium is also configured to remove the first measure from the display and to time the removing of the first measure of music to a predetermined tempo. The display screen and user interface of the device are embodied in a tablet computing device.

In accordance with another aspect of the present invention, the non-transitory computer readable medium is further programmed to set the timing to an audio click-track. The non-transitory computer readable medium is also programmed to provide a count-off before the beginning of an exercise and to provide options to the user such that the user can choose the predetermined tempo. Additionally, the non-transitory computer readable medium is further programmed to pre-program the predetermined tempo based on a level of skill of the user and to display a visual point of focus for the user, wherein the visual point of focus is configured to train the user to engage a fovea to acquire pitch information in the measure of music and a parafovea to acquire rhythm information from the measure of music. The non-transitory computer readable medium is programmed to provide a user with a set of musical works for training and to make a new set of musical works for training available on a periodic basis. The system can also include a recording device for recording the music played by the user. The non-transitory computer readable medium can also be programmed to compare the music played by the user to an exemplary track in order to provide the user with feedback on performance.

BRIEF DESCRIPTION OF THE DRAWINGS

The accompanying drawings provide visual representations, which will be used to more fully describe the representative embodiments disclosed herein and can be used by those skilled in the art to better understand them and their inherent advantages. In these drawings, like reference numerals identify corresponding elements and:

FIGS. 1A-1C illustrate a reading ahead exercise for display to a student according to an embodiment of the present invention.

DETAILED DESCRIPTION

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

An embodiment in accordance with the present invention provides a method and device for training a student to sight-read music. The method includes displaying a measure of music having at least a first and second phrase of notes. As the student moves through the music, the phrases of notes are removed from the measure of music, in such a way to encourage the student to read ahead of the point at which she is playing. In some exercises, a focal point can be provided in order to train the student to engage the fovea for acquiring pitch information from the measure of music and the parafovea for acquiring rhythm information from the measure of music. The method can be executed on a dedicated computing device such as a tablet or in the form of an application or program for use on a number of different computing devices.

FIGS. 1A-1C illustrate a reading ahead exercise for display to a student according to an embodiment of the present invention. The reading ahead exercises illustrated in FIGS. 1A-1C are designed to be performed in real time. FIG. 1A illustrates the first screen that the student will see. As illustrated, all of the phrases in the two measures of music are displayed on the screen. The phrases of music are removed from the exercise as the student begins playing each phrase, as illustrated in FIG. 1B, which has the first phrase of music removed from the exercise and FIG. 1C, which has the second phrase of music removed from the exercise. A click track is used during the exercise to count down to the beginning of the exercise and also to keep the tempo for the duration of the exercise. The click track can be pre-programmed to a default tempo, or alternately the click track can be adjusted by the student to be slower or faster, preferably, in a limited range. In adjusting the tempo of the click track the student also adjusts the speed of the removal of the phrases of music.

Figure 2A:
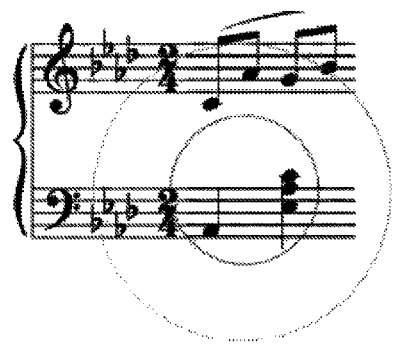
FIGS. 2A-2C illustrate a focal point training exercise for display to a student according to an embodiment of the present invention.
Figure 2B:
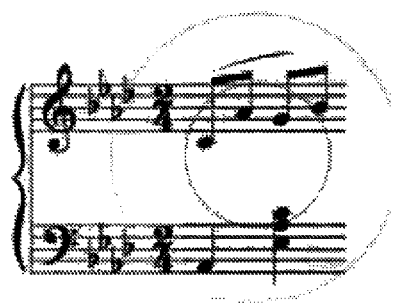
Figure 2C:
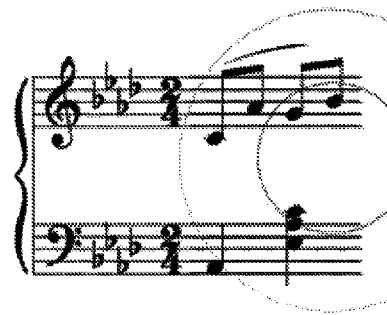

FIGS. 2A-2C illustrate a focal point training exercise for display to a student according to an embodiment of the present invention. The focal point training exercise illustrated in FIGS. 2A-2C is configured to train the student to use her different ocular fields, such as the fovea and the parafovea, for recognizing musical notes and rhythmic patterns in a measure of music. As illustrated in FIGS. 2A-2C a dot shows the point of fixation for the student's eye and the outlines illustrate the areas of focus for the fovea and parafovea. Generally, a person who is trained can make between four and six fixations in one second. Reaching this range of fixations is the goal of this exercise. In practice, the dot is shown on the screen in a fixed location of a given measure, where the user should focus.

Further with respect to FIGS. 2A-2C, the rate at which the fixations are displayed is variable and can be preprogrammed to follow a certain increase in speed or can be adjusted by the user as she progresses with the exercise. Preferably, a student should watch each sequence of the music at progressively faster tempi, until they are reading at the preferable goal speed of four to six fixations per second. When the student has memorized the measure, she should play it from memory. The student can also repeat this process for each measure of the piece. It should also be noted that the exercise can be optimized by using the eye movements of an expert sight reader to provide the fixation points and optimal speed for reading through the measure of music. It should also be noted that goal speed can be adjusted manually in the program to account for the skill levels of different users, but can also be programmed to be adjusted automatically to continue to challenge the user during sight reading training. For instance, if the user previously trained at 4 fixations per second for several sessions, in the next training session the fixations might be increased to 5 fixations per second. The user can also have the ability to set a frequency at which the number of fixations per second are increased. Therefore, the program automatically adjusts the speed at which the exercises are presented over a period of training in such a way as to always be at the optimum level of difficulty for inducing the most effective learning experience.

Figure 3A:
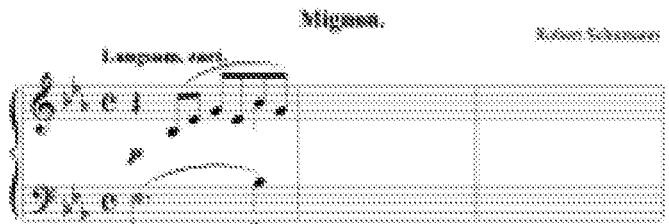
FIGS. 3A-3C illustrate a flash-memory exercise for display to a student according to an embodiment of the present invention.
Figure 3B:
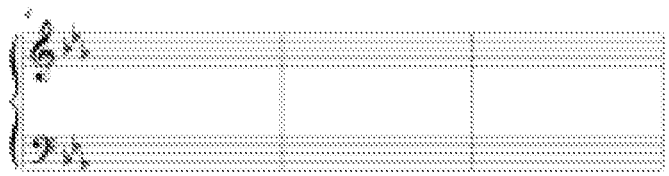
Figure 3C:
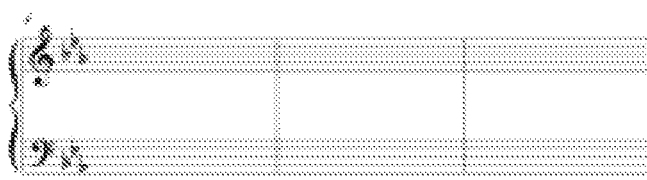

FIGS. 3A-3C illustrate a flash-memory exercise for display to a student according to an embodiment of the present invention. Preferably, the flash-memory exercise will be done after the focal point training exercise. The flash-memory exercise is not configured to actively guide the student's eye through the exercise. Instead this exercise is configured to require the student to flash-memorize a measure of music in a very limited amount of time and then play it back from memory. A count-off can be used to precede each measure of music. On the first beat of the measure, the measure of music will appear on the screen for a short period of time, and will disappear before the click-track reaches the end of the measure. At the end of the measure, the user will then be asked to play the measure from memory. This process can then be used for each measure of music in the piece. The exercise can be pre-programmed with the amount of time the measure will be displayed. Alternately, the student can adjust the amount of time the measure will be displayed, preferably within a limited range, to ensure the student's continued progress.

Figure 4:
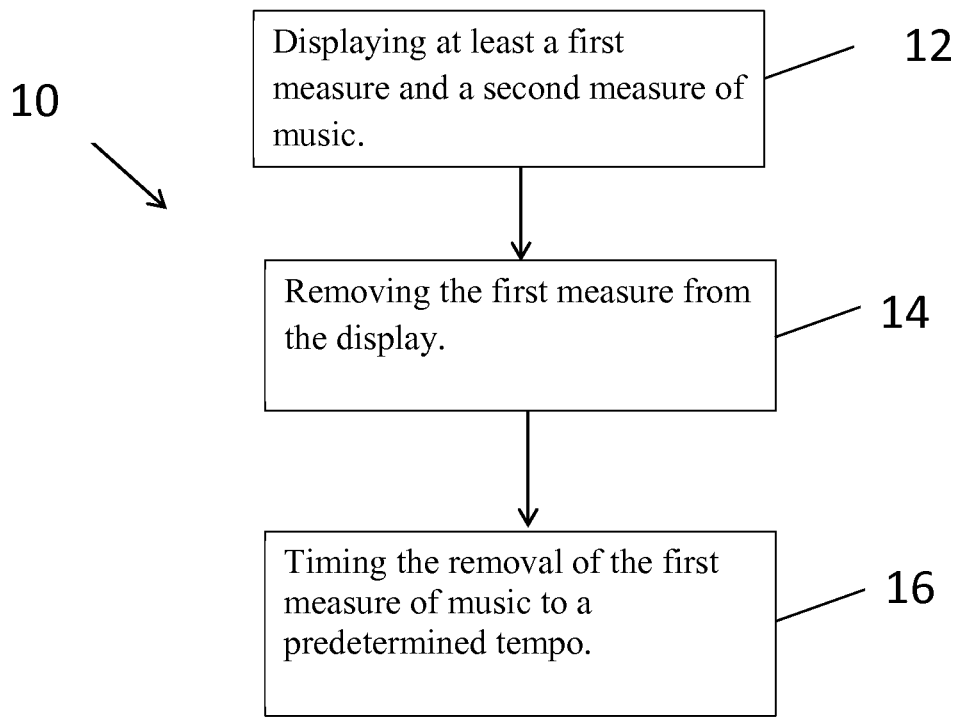
FIG. 4 illustrates a flow diagram of a method for training a student to sight read music according to an embodiment of the present invention.

FIG. 4 illustrates a flow diagram of a method for training a student to sight read music according to an embodiment of the present invention. The method 10 includes a step 12 of displaying at least a first measure and a second measure of music. The first measure is disposed in a first position ahead of the second measure disposed in a second position. Step 14 includes removing the first measure from the display. Additionally, step 16 includes timing the removal of the first measure of music to a predetermined tempo.

The method 10 can also include a number of different steps and features including but not limited to those that follow, herein. The method can include setting the timing to an audio click-track. A count-off can be provided before the beginning of an exercise. With respect to the click track and count-off, the user can choose or adjust the predetermined tempo within a given range or the predetermined tempo can further be programmed based on a level of skill of the user. The method can also include displaying a visual point of focus for the user, wherein the visual point of focus is configured to train the user to engage a fovea to acquire pitch information in the measure of music and a parafovea to acquire rhythm information from the measure of music. The user can be provided with a set of musical works for training and new sets of musical works can be made available on a periodic basis. It should also be noted that the method can be executed as an application for use on a smart phone or tablet device, as a computer program for use on a desktop, laptop, or other computing platform, or as a stand-alone device, which will be described in further detail below.

Figure 5:
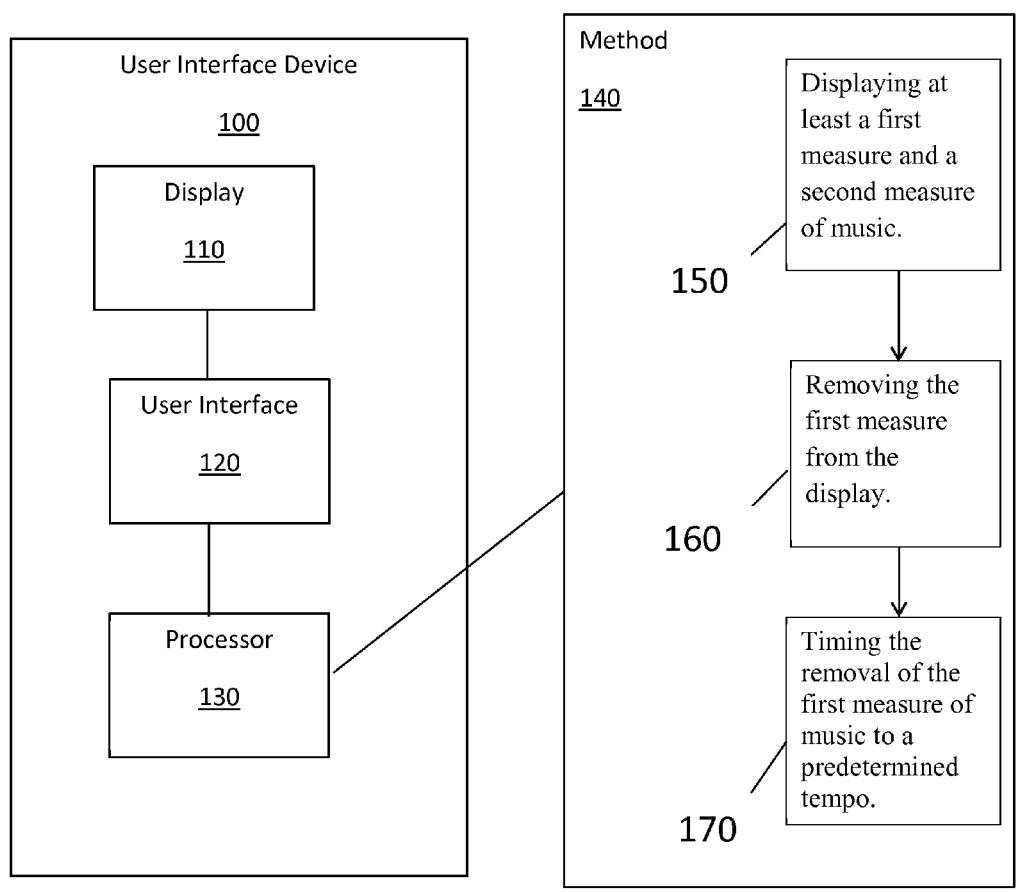
FIG. 5 illustrates a schematic diagram of a dedicated device for training a student to sight read music according to an embodiment of the present invention.

FIG. 5 illustrates a schematic diagram of a dedicated system for training a student to sight read music according to an embodiment of the present invention. The system 100 includes a display 110, a user interface, and a processor 130. The display 110 can take the form of a screen that is either separate from or integrated into the system 100. Preferably, the screen is the size of a sheet of music, such as an A4 size, in order to best mimic a typical sight reading experience for the student. However, any size screen known to or conceivable by one of skill in the art and useful for this application could also be used. The system 100 also includes the user interface 120. The user interface can be a touch screen implementation, such as is used on a tablet computing device. Alternately, the user interface 120, can be a keyboard, touchpad, mouse, or any other suitable user interface device known to or conceivable by one of skill in the art. The processor can be loaded with a non-transitory computer readable medium programmed to execute all of the steps of the method.

Further, with respect to FIG. 5, the processor 130 can take the form of any type of computing processor known to or conceivable by one of skill in the art. The processor 130 is configured to execute the method described above with respect to FIG. 4, or any other suitable method for training the student to sight read music. As discussed above, the method 140 preferably, includes a step 150 of displaying at least a first measure and a second measure of music. The first measure is disposed in a first position ahead of the second measure disposed in a second position. Step 160 includes removing the first measure from the display. Additionally, step 170 includes timing the removing of the first measure of music to a predetermined tempo. The system 100 can also include a hardwired or wireless internet, Bluetooth, or other communications connection, such that the system can communicate with the internet or a network in order to update the application, and exercises. Additionally, the system can include a recording device for recording the music played by the user for feedback and playback purposes.

If the present invention is implemented as an application for purchase and use on a smartphone or tablet-type computing device, a package of the exercises and a starter package of musical pieces to use with the exercises can be provided for a base fee. Update packages of musical pieces can be provided periodically, as an in-application purchase. In addition it may be possible to offer different applications for students of different skill levels or ages as well as based on the instrument played by the student.

In using the application, each user will take an initial diagnostic test and/or tutorial that consists of a series of basic training exercises to rate baseline performance in the different categories of exercises. These results are stored in a transcript file that keeps track of exercises completed, scores and data for given exercises, and recording of performances that will be stored locally with tracking data uploaded to a server. Users can track overall progress and share their results with the instructor. Students will also be able to compare their transcripts to those of other users and also overall averages to get a sense of progress. Additional feedback systems can also be included, such as user recordings, comparisons to an expertly played track, recording processing to provide students with a grade on their performance, and any other form of feedback known to or conceivable by one of skill in the art.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for training a user to sight read music comprising:
    prompting the user to set a tempo;
    displaying at least a first measure and a second measure of music wherein the first measure is disposed in a first position ahead of the second measure disposed in a second position;
    removing the first measure from the display before the first measure is to be played by the user, such that the user is encouraged to read ahead; and
    timing the removal of the first measure of music to the tempo.

2. The method of claim 1 further comprising setting the timing to an audio click-track.

3. The method of claim 1 further comprising providing a count-off before the beginning of an exercise.

4. The method of claim 1 further comprising pre-programming the predetermined tempo based on a level of skill of the user.

5. The method of claim 1 further comprising displaying a visual point of focus for the user, wherein the visual point of focus is configured to train the user to engage a fovea to acquire pitch information in the measure of music and a parafovea to acquire rhythm information from the measure of music.

6. The method of claim 1 further comprising providing a user with a set of musical works for training.

7. The method of claim 1 further comprising making a new set of musical works for training available on a periodic basis.

8. The method of claim 1 further comprising fixing the method on a computer readable medium.

9. A system for training a user to sight read music comprising:
    a display screen;
    a user interface;
    a non-transitory computer readable medium programmed to:
    prompt the user to set a tempo;
    display at least a first measure and a second measure of music wherein the first measure is disposed in a first position ahead of the second measure disposed in a second position;
    remove the first measure from the display before the first measure is to be played by the user, such that the user is encouraged to read ahead; and
    time the removal of the first measure of music to the tempo.

10. The system of claim 9 wherein the display screen and user interface are embodied in a tablet computing device.

11. The system of claim 9 wherein the non-transitory computer readable medium is further programmed to set the timing to an audio click-track.

12. The system of claim 9 wherein the non-transitory computer readable medium is further programmed to provide a count-off before the beginning of an exercise.

13. The system of claim 9 wherein the non-transitory computer readable medium is further programmed to pre-program the predetermined tempo based on a level of skill of the user.

14. The system of claim 9 wherein the non-transitory computer readable medium is further programmed to display a visual point of focus for the user, wherein the visual point of focus is configured to train the user to engage a fovea to acquire pitch information in the measure of music and a parafovea to acquire rhythm information from the measure of music.

15. The system of claim 9 wherein the non-transitory computer readable medium is further programmed to provide a user with a set of musical works for training.

16. The system of claim 9 wherein the non-transitory computer readable medium is further programmed to make a new set of musical works for training available on a periodic basis.

17. The system of claim 9 further comprising a recording device for recording the music played by the user.

18. The system of claim 17 further comprising the non-transitory computer readable medium being programmed to compare the music played by the user to an exemplary track in order to provide the user with feedback on performance.

* * * * *